Dec. 12, 1967     D. GRUBE     3,357,225
CONTINUOUS ROLLING MILLS, PARTICULARLY
DRAWING REDUCING MILLS

Filed July 2, 1964     4 Sheets-Sheet

United States Patent Office 3,357,225
Patented Dec. 12, 1967

3,357,225
CONTINUOUS ROLLING MILLS, PARTICULARLY DRAWING REDUCING MILLS
Dietrich Grube, Ratingen-Tiefenbroich, Germany, assignor to Schloemann Aktiengesellschaft, Dusseldorf, Germany
Filed July 2, 1964, Ser. No. 379,857
Claims priority, application Germany, July 4, 1963, Sch 33,498
4 Claims. (Cl. 72—249)

ABSTRACT OF THE DISCLOSURE

A drive for successive roll stands of a multi-stand stretch rolling mill including two prime movers for all the stands, one a constant speed and one a variable speed prime mover, each prime mover being provided with a drive shaft common to all of the roll stands, and individual gearing means for each roll stand connecting both of the drive shafts to that stand, each of the gearing means including two summation drive means, one of the summation drive means having two input shafts, one driven at a constant speed from the constant speed prime mover, and the other driven at a variable speed from the constant speed prime mover to drive an output shaft at a variable speed, and the other summation drive means being driven by said output shaft of said one of said summation drive means and by said variable speed prime mover drive shaft to drive a shaft to rotate the mill stand.

---

Figure 1:
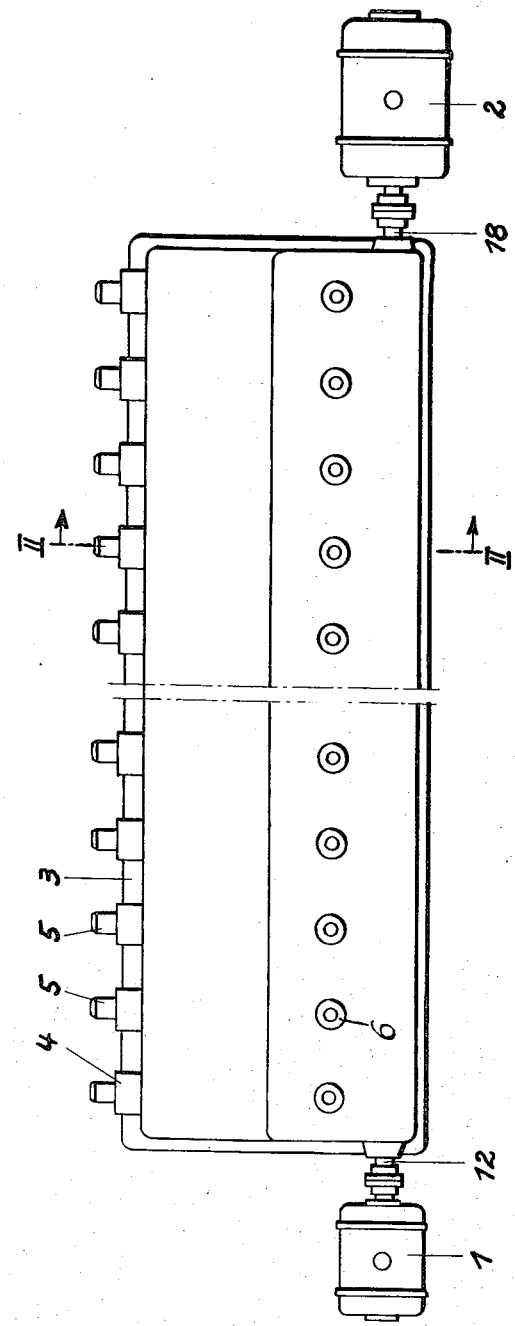

The invention relates to a group drive for a continuous rolling mill, particularly a stretch-reduction mill for the production of tubes, in which the several roll stands are driven through a group drive permitting the speeds of the several roll stands to be independently adjustably varied within a predetermined speed range by variable speed transmissions incorporated in their several drives. The association of a variable speed transmission with each stand has the advantage of permitting the speed sequence characteristic of the rolling mill, that is, the grading of the speeds of revolution of the individual roll stands, to be varied without the substitution of gear wheels.

According to one known proposal the variable speed transmission associated with each roll stand is constituted by a pump combined with an oil hydraulic motor, all the pumps being driven in common by the drive shaft of a constant speed A.C. motor (U.S. Patent 1,466,642). By adjustably varying the capacities of the pumps the speeds delivered to the several stands can be controlled. Moreover, a common control means governing all the pumps permits the speed ratios of all consecutive stands to be adjustably varied upwards or downwards according to a geometric progression within the control range of the variable hydraulic transmissions, in such manner that the draft or compression ratio of the tube from stand to stand is maintained when the speeds of the stands rise or fall. Such variable transmissions have the advantage of being of simple construction, resistant to wear and reliable in operation. However, the unavoidable losses due to slippage are a drawback so that each transmission must be associated with a slip compensating control means for ensuring the necessary rigidity of the drive.

According to another proposal the variable transmissions are embodied in so-called superimposition drives, of a kind resembling the drives of the calender rolls in paper making machinery (U.S. Patents 1,594,394, 1,594,395, 1,594,396). The difference merely lies in the control of the modifying speed. Whereas in known superimposition drives for calender rolls the modifying speed is controlled by a preceding variable differential gearing driven by a variable speed electric motor, the control of the modifying speed in the summation drives conventionally used in drawing reducing mills is effected by variable hydraulic transmissions, the modifying speed being obtained from the input shaft of the drive (German Patent 970,102). Although the employment of superimposition drives diminishes the technological complexities which are involved in the use of fluid transmissions with compensation for slip, control of the modifying speed when this is as high as the usual modifying speeds required for expanding the speed sequence characteristic necessitates the provision of complex control and regulating equipment. The complexity of this control and regulating gear is due to the fact that the speed sequence characteristic of the roll stands is not defined by a linear curve but by a curve which in relation to the middle range flattens in the lower and upper ranges so that a change in speed does not involve like decrements or increments in the speed differences between all the stands.

The above mentioned complicated control gear for the variable speed transmissions can be avoided in a manner known at the art by dispensing with the separate control of each roll stand and merely aiming at a continuous expansion of the speed sequence characteristic of the mill. This can be done by associating two prime movers with each group drive, the speed of one being variable and superimposed in summation gears upon the speeds delivered to the several stands. In such an arrangement the transmission ratios of the gear wheels deriving the superimposed modifying speeds for the several roll stands from the output shaft of the variable speed motor are preferably linearly graduated, whereas the gear ratios of the transmissions from the constant speed shaft to the several stands are preferably so graduated that the combination of both speeds in the summation drives associated with the several roll stands corresponds to the prescribed speed sequence characteristic. Any increase or reduction in the speed of the variable motor will then produce a constant increment or decrement of the differences in speed between consecutive roll stands and hence expand the sequence of speeds according to existing operational conditions. However, individual adjustment of the relative speeds of the stands in order to modify the speed sequence characteristic is impossible in such an arrangement.

The object of the present invention is to provide the possibility of expanding the speed sequence characteristic, as in the above described group drive, besides permitting the speed sequence characteristic to be modified by providing facilities for the individual adjustment of the speeds of the several stands. Moreover, it is proposed to reduce the power flow through the variable speed transmissions sufficiently to ensure the necessary rigidity of the output speeds, which depends upon this factor. The invention consists in associating the group drive in conventional manner with two prime movers of which one delivers a constant speed, whereas the basic speed of the other is continuously variable, in delivering the speeds which are combined in the several summation drives to the associated roll stands, in deriving the fundamental speeds that is, the speeds introduced into the summation drives from the shaft driven by the prime mover delivering the variable speed, in providing between this drive shaft and the input shafts of the summation drives bevel gear transmissions having gear ratios which in conventional manner rise linearly from stand to stand; in deriving the superimposed modifying speeds which are introduced into the summation drives from the drive shaft of the prime mover that delivers the constant speed and in adjustably varying said modifying speeds in variable speed transmissions associated in conventional manner with the summation drives.

Since the modifying speeds introduced into the summation drives can be varied by the variable speed transmissions the required speed sequence characteristic can be precisely adjusted, whereas variation of the linear sequence of fundamental speeds supplied by the variable speed prime mover can be used for expanding the speed sequence characteristic for the purpose of changing the guage of the rolled tube stock, supplementary control means being unnecessary. Another convenient feature is that the variable transmissions provided for varying the modifying speeds need not be adjusted when it is merely desired to expand the speed sequence characteristic of the mill.

The variability range of the transmission ratio $i$ of the variable speed transmissions should generally extend from $i=1$ to $i=10$ or less. In order to keep the power flow through the variable speed transmissions as low as possible these are associated with the summation drives in such a way that their output speeds are used to change the modifying speeds which are combined with the fundamental speeds in the summation drives. This can most readily be done by embodying each summation drive in a double epicyclic gear train comprising three input shafts and one output shaft for driving the associated roll stand, the constant modifying speed being combined with the variable speed supplied by the variable speed transmission in the first epicyclic gear train, and the correspondingly varied modifying speed being then delivered to the second epicyclic gear train for combination therein with the fundamental speed. Conveniently the variable speed transmission derives its input speed from the constant speed input shaft of the group drive. With respect to the design of the variable speed transmissions a preferred arrangement is that their input speeds should be equal to the constant modifying speed introduced into the associated summation drives. For organically combining the variable speed transmissions with the summation drives, the input shaft of each variable speed transmission is conveniently a layshaft of the input shaft delivering the constant modifying speed to the summation drive.

In a further development of the invention the speed range of the variable speed driving motor is extended beyond the range required for expanding the speed sequence characteristis of the mill to permit the variability range of the individual variable transmissions to be simultaneously raised and lowered. This permits the overall variability range of the mill to be substantially extended and the range of possible rolling programs for which the mill can be employed to be widened. Conveniently the summation drives are adjusted to a given speed sequence characteristic at a maximum possible fundamental speed of the variable speed motor, so that the power flow through the variable speed transmissions is a minimum.

Figure 2:
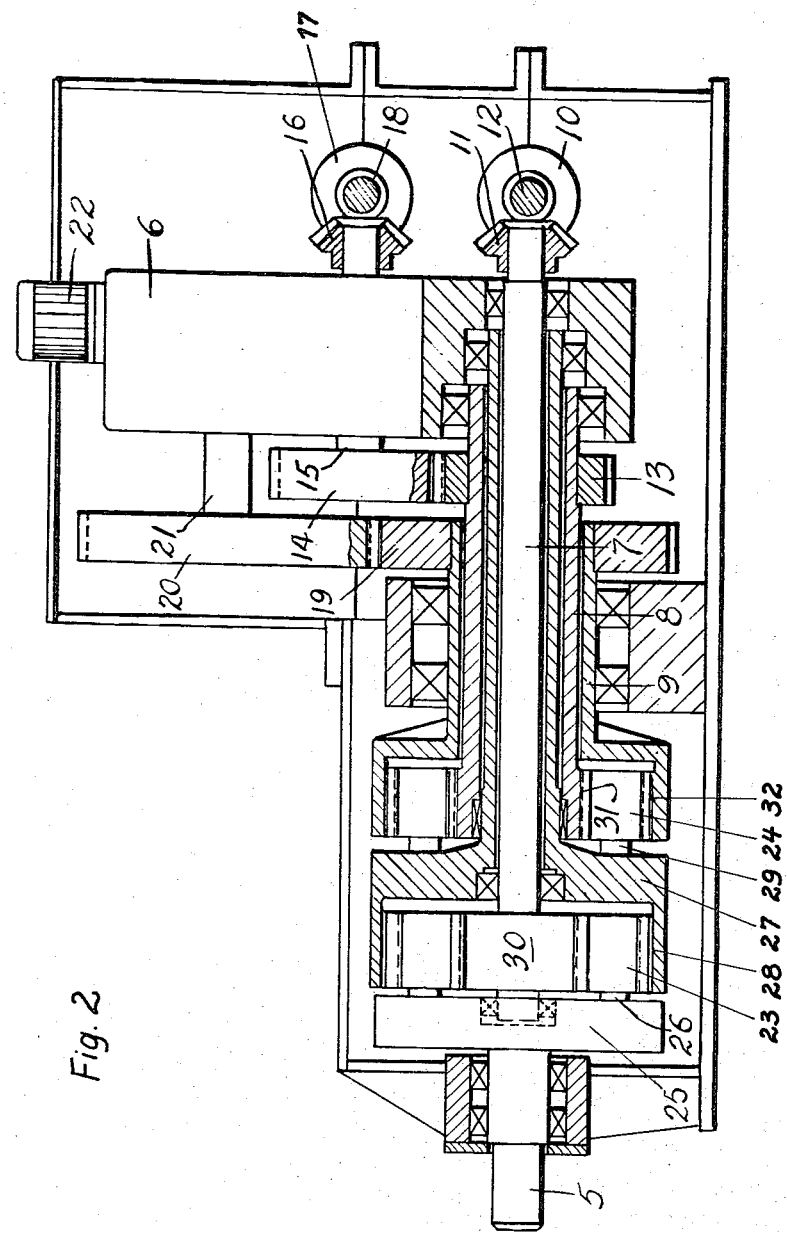
Figure 3:
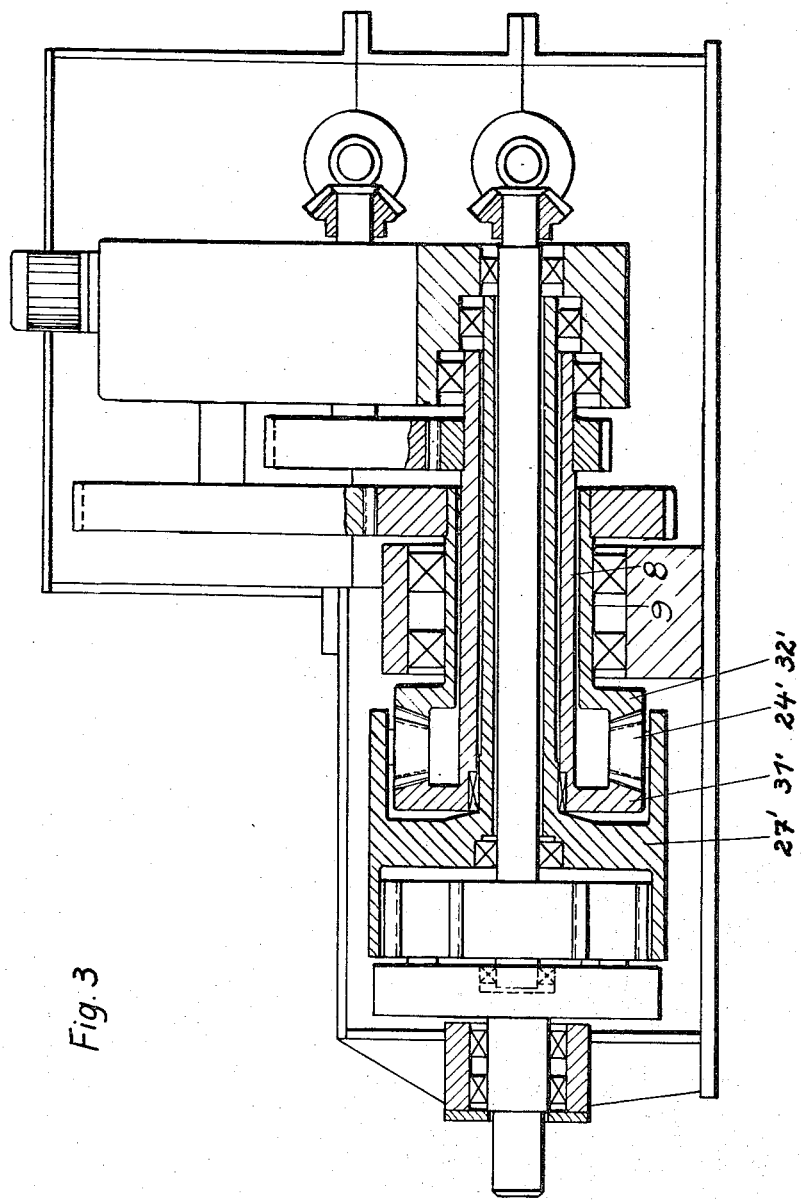
Figure 4:
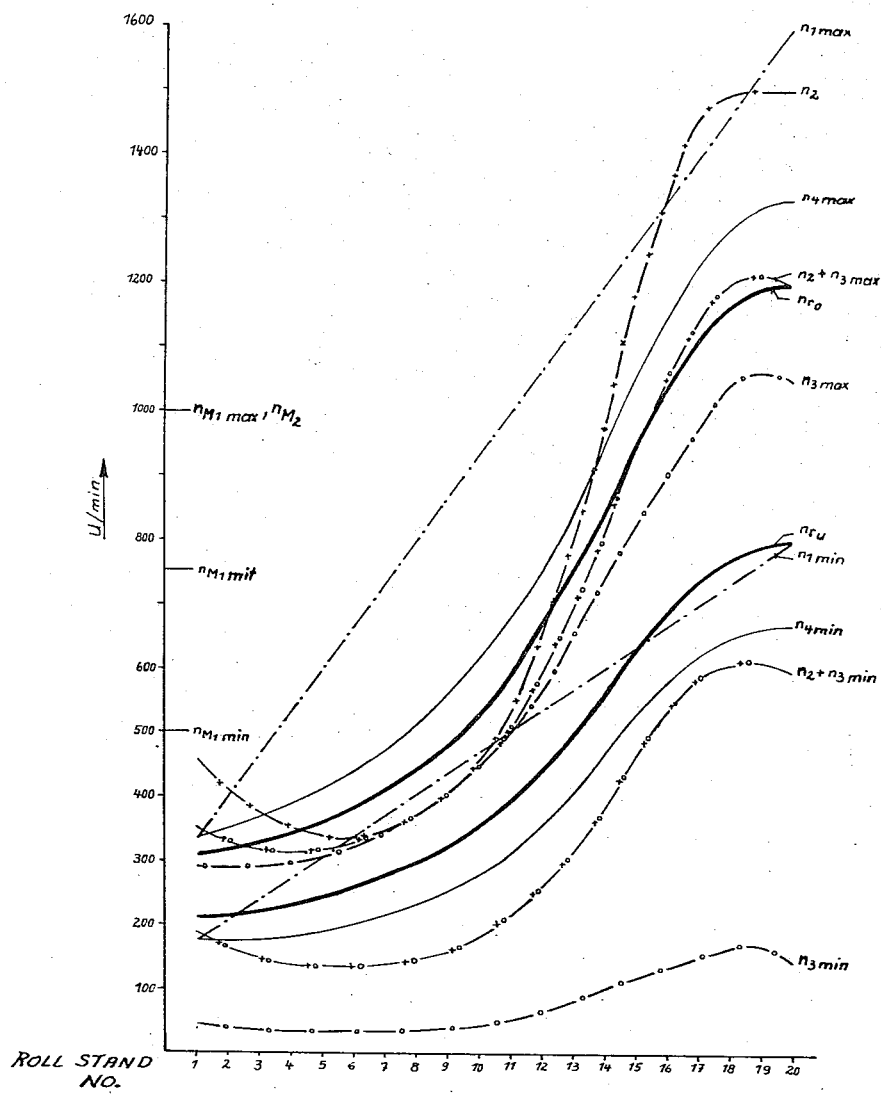

These and other features of the invention will now be described by reference to an embodiment of a group drive according to the invention which is illustratively shown in the accompanying drawings in which FIG. 1 is a plan view of the group drive according to the invention, FIG. 2 is a section taken on the line II—II in FIG. 1 showing a drive gearing assembly, FIG. 3 is a modification of the second epicyclic gear train in FIG. 2 in a drive gearing assembly, and FIG. 4 is a graph representing the speed relationships provided by the illustrated group drive.

The group drive in FIG. 1 comprises a variable speed D.C. motor or prime mover 1, a constant speed A.C. motor or prime mover 2, a plurality of summation drives 4 in a casing 3 with output shafts 5 to the several roll stands not shown in the drawing, and a variable transmission 6 associated with each of the summation drives.

As will be seen by references to FIGS. 2 and 3 the complete summation drive for each roll stand is made up of two differential drive units to provide three input shafts 7, 8 and 9 and one output shaft 5. Input shaft 7 is geared to the drive shaft 12 of the variable speed D.C. motor by a pair of bevel gears 10 and 11, input shaft 8 is geared to the drive shaft 18 of the constant speed A.C. motor 2 by a pair of spur gears 13, 14, a layshaft 15 and a pair of bevel gears 16, 17, whereas input shaft 9 is geared to the output shaft 21 of a variable transmission 6 by a pair of spur gears 19, 20. Layshaft 15 is at the same time the input shaft of the variable transmission 6. The speed ratio of the variable transmission 6 is controllable by adjustment of a control at 22.

In FIG. 2 the complete summation drive for each roll stand includes double epicyclic gearing comprising two single summation, one using planet gears 23 and 24. The planet gears 23 are mounted on stub shafts 26 in a carrier 25 which is fast on output shaft 5, whereas planet gears 24 are mounted on stub shafts 29 in a carrier 27 which has inner gear teeth 28 forming the outer gear ring cooperating with the planet gears 23.

The variable fundamental speed is supplied by input shaft 7 which carries a sun gear 30 at its forward end, and is transmitted to the output shaft 5 by planet gears 23 and carrier 25 which is fast on output shaft 5, subject to the speed change due to the transmission ratio between sun gear 30 and planet wheels 23. The superimposed modifying constant speed is introduced by input shaft 8 and is transmitted from sun gear 31 to planet gears 24 and their carrier 27 which at the same time forms the outer gear ring 28 of planet gears 23 and which superimposes this speed upon the fundamental speed of input shaft 7 or sun gear 30, again subject to the existing gear ratio between sun gear 31 and planet gears 24. For adjustably varying the superimposed modifying constant speed delivered by shaft 8, gear ring 32 associated with planet gears 24 is connected to input shaft 9 which is driven through the variable transmission 6, so that this variable speed can be additionally superimposed upon the constant input speed of shaft 8.

For modifying the superimposed constant speed of input shaft 8 the epicyclic summation gearing formed by sun gear 31, planet gears 24 and gear ring 32 may be replaced in the manner illustrated in FIG. 3 by a differential gearing comprising bevel gears 24' mounted in a carrier 27' in the form of a cage and bevel gears 31' and 32' which are fast on the two input shafts 8 and 9 respectively.

The speed curves shown in the graph in FIG. 4 relate to a group drive for 20 roll stands numbered 1 to 20 in FIG. 4. For supplying the fundamental speeds to the several summation drives the D.C. motor was used of which the speed $n$ could be varied from $n_{M1\ min}=500$ r.p.m. to $n_{M1\ max}=1000$ r.pm., whereas the superimposed modifying speed was supplied by the A.C. motor 2 providing a constant speed $n_{M2}=1000$ r.p.m.

The curves $n_{1\ max}$ and $n_{1\ min}$ represent the linear speed increments of the input shafts 7 from summation drive to summation drive at the maximum and minimum speeds $n_{M1\ max}$ and $n_{M1\ min}$ of the variable D.C. motor. Curve $n_2$ represents the superimposed modifying speeds provided by the several input shafts 8, whereas curves $n_{3\ min}$ and $n_{3\ max}$ represent the required minimum and maximum supermodifying speeds of input shaft 9. The summation curves $n_2+n_{3\ min}$ and $n_2+n_{3\ max}$ give the total minimum and maximum modifying speeds which can be impressed upon the fundamental speed of input shaft 7 by carrier 27 and gear ring 28. The resultant output speeds of output shaft 5 of each summation drive are $n_{4\ min}$ for $n_{1\ min}$ and $n_{4\ max}$ for $n_{1\ max}$. The individual control range made available by the variable transmissions 6 between curves $n_{ru}$ and $n_{ro}$ relates to an average speed $n_{M1\ mitt}$ of the variable speed input motor. When the fundamental speed is increased the entire individual control range rises until its upper limit represented by $n_\text{rom}$ at the fundamental speed $n_\text{M1 max}$ coincides with curve $n_\text{4 max}$. When the fundamental speed is reduced the lower limit for $n_\text{ru}$ is the curve $n_\text{4 min}$. For adjustment to a prescribed speed sequence characteristic, $n_\text{M1}$ is so chosen that the supermodifying speed curve $n_3$ is a minimum in order to reduce the power flow through the variable transmissions to a minmum. For expanding the existing speed sequence characteristic it is merely necessary to vary the fundamental speed $n_1$.

I claim:

1. In a drive means for a mill of the continuous stretch-reducing rolling mill type having a plurality of successive roll stands, a common variable speed prime mover and a common constant speed prime mover for all of said roll stands, a drive gearing assembly for each said roll stand, a common constant speed driving shaft extending from said constant speed prime mover to adjacent each said roll stand, a common variable speed driving shaft extending from said variable speed prime mover to adjacent each said roll stand, each said drive gearing assembly comprising an output shaft adapted to drive the rolls of the corresponding roll stand, a first summation drive means driving said output shaft, and including a first and second input means whose speeds are to be summed, and an output means connected to said output shaft, bevel gear means connecting said first input means to said common variable speed driving shaft to be driven thereby, a second summation drive means, having an output means, and two input means, the output means of said second summation drive means being connected to drive said second input means of said first summation drive means, bevel gear means providing a constant speed driving connection from said constant speed driving shaft, a variable speed driving connection driven by said constant speed driving connection, said constant speed and said variable speed driving connections being connected one to each of said two input means of said second summation drive means, and means to vary the speed of said variable speed driving connection.

2. In the drive means of claim 1, said first summation drive means being an epicyclic gearing having one element driving said single output shaft and including one driven element driven directly from said variable speed driving shaft, and second driven element driven by said second summation drive means, said second summation drive means being an epicyclic gearing including one driving element drivingly connected to said second driven element of said first summation drive means, one driven element driven at a constant speed ratio from said constant speed driving shaft, and a second driven element driven at a variable speed by said variable speed driving connection.

3. The drive means of claim 1, in which said bevel gear means connecting said first input means to said common variable speed driving shaft to each said gear means of the successive roll stands has a gear ratio such that the speed of each said first input means of each said roll stand increases linearly from the roll stand at the first of said successive roll stands to the last of said successive roll stands.

4. The drive means of claim 1, in which the gear ratios of said bevel gears providing a constant speed driving connection from said constant speed driving shaft to each said drive gearing assembly are all the same.

References Cited

UNITED STATES PATENTS

| | | | |
|---|---|---|---|
| 1,514,405 | 11/1924 | Talbot | 72—249 |
| 2,757,556 | 8/1956 | Vebing | 72—249 |
| 2,972,916 | 2/1961 | Morgan | 72—249 |
| 3,013,452 | 12/1961 | Hornbostel | 72—249 |
| 3,129,618 | 4/1964 | Hergeth | 72—249 |

RICHARD J. HERBST, *Primary Examiner.*

A. RUDERMAN, *Assistant Examiner.*